(12) United States Patent
Sterngren (10) Patent No.: US 9,602,810 B2
(45) Date of Patent: Mar. 21, 2017

(54) IMAGE SENSOR POSITIONING APPARATUS AND METHOD

(71) Applicant: AXIS AB, Lund (SE)

(72) Inventor: Fredrik Sterngren, Lund (SE)

(73) Assignee: Axis AB, Lund (SE)

( * ) Notice: Subject to any disclaimer, the term of this patent is extended or adjusted under 35 U.S.C. 154(b) by 592 days.

(21) Appl. No.: 13/957,221

(22) Filed: Aug. 1, 2013

(65) Prior Publication Data

US 2014/0036096 A1 Feb. 6, 2014

Related U.S. Application Data

(60) Provisional application No. 61/680,428, filed on Aug. 7, 2012.

(30) Foreign Application Priority Data

Aug. 6, 2012 (EP) ..................... 12179328

(51) Int. Cl.
*H04N 17/00* (2006.01)
*H04N 5/225* (2006.01)

(52) U.S. Cl.
CPC .......... *H04N 17/002* (2013.01); *H04N 5/2253* (2013.01)

(58) Field of Classification Search
CPC .......... G02B 27/62; G02B 7/003; G02B 7/28; H04N 5/2253; H04N 17/002

(Continued)

(56) References Cited

U.S. PATENT DOCUMENTS 4,956,546 A * 9/1990 Nishibe ............ G02B 7/28 250/203.1
4,978,224 A * 12/1990 Kishimoto ............ H05K 13/08 356/394

(Continued)

FOREIGN PATENT DOCUMENTS

DE 10228882 A1 2/2004
EP 2148501 A2 1/2010

OTHER PUBLICATIONS

"The Development of Camera Calibration Methods and Models"; Clarke, T.A. & Fryer, J.F. 1998. Photogrammetric Record, 16(91): pp. 51-66.

(Continued)

*Primary Examiner* — Nathnael Aynalem
(74) *Attorney, Agent, or Firm* — Volpe and Koenig, P.C.

(57) ABSTRACT

A method is provided for positioning an image sensor having a light receiving plane within a camera and a system is provided for identifying the position of an image sensor. The method comprises projecting a first group of substantially parallel light beams representing a first predetermined pattern onto the light receiving plane of the image sensor at an angle of incidence, projecting a second group of substantially parallel light beams representing a second predetermined pattern onto the light receiving plane of the image sensor at an angle of incidence, registering positions on the light receiving plane of the image sensor where the light beams are detected by the image sensor, generating adjustment information based on the registered positions, indicating if the present position of the image sensor is an erroneous position or not, and adjusting the position of the image sensor based on the adjustment information.

12 Claims, 8 Drawing Sheets

(58) Field of Classification Search
USPC .................... 348/190; 356/237.2, 239.3, 508
See application file for complete search history.

(56) References Cited

U.S. PATENT DOCUMENTS

| | | | | |
|---|---|---|---|---|
| 5,182,615 | A * | 1/1993 | Kurosawa | G03F 9/7049 250/548 |
| 5,225,892 | A * | 7/1993 | Matsugu | G03F 9/7076 250/548 |
| 5,243,195 | A * | 9/1993 | Nishi | G03F 9/7088 250/548 |
| 5,502,311 | A * | 3/1996 | Imai | G03F 7/70858 250/548 |
| 2005/0041242 | A1 | 2/2005 | Gomm et al. | |
| 2006/0070417 | A1 * | 4/2006 | Nieminen | G01B 11/306 72/11.7 |
| 2006/0085161 | A1 * | 4/2006 | Smeets | G03F 9/7003 702/150 |
| 2009/0161193 | A1 * | 6/2009 | Maeda | G02B 26/0833 359/263 |
| 2012/0273658 | A1 * | 11/2012 | Wieland | B82Y 40/00 250/208.2 |

OTHER PUBLICATIONS

"Current Metric Aerial Camera Calibration in the U.S."; for SURE 340, Photogrammetry I, prepared by Tim DeMumbrum; May 1, 2002; the Center for Photogrammetric Training, Principles of Photography and Imaging, pp. 82-96.

"Application of Shack-Hartmann Wavefront Sensors to Optical System Calibration and Alignment"; Daniel R. Neal and Justin Mansell; Proceedings of the 2nd International Workshop, Adaptive Optics for Industry and Medicine, University of Durham, England, Jul. 12 -16, 1999, pp. 234-240.

"Novel Composite Coded Pattern for Small Angle Measurement Using Imaging Method"; Nukala et al., Novel Optical Systems Design and Optimization IX; Proceedings of SPIE vol. 6289, 62891D (2006) pp. 1-11.

* cited by examiner

IMAGE SENSOR POSITIONING APPARATUS AND METHOD

CROSS REFERENCE TO RELATED APPLICATIONS

This application claims the benefit of U.S. provisional application No. 61/680,428 filed Aug. 7, 2012, and claims priority to European Application No. 12179328.5 filed Aug. 6, 2012, which are incorporated by reference as if fully set forth.

FIELD OF INVENTION

The present invention relates to a system and a method for measuring the positioning of an image sensor in a camera.

BACKGROUND

The image quality of images captured by digital imaging devices such as digital cameras is increasingly important. To achieve increased quality manufacturers has increased the number of pixels captured by the sensor, the light sensitivity, the optics arranged to guide light representing the image to an image sensor of the camera. Another important factor directly affecting the quality of an image captured is the positioning of the image sensor. In order to achieve optimal image quality the image sensor of the camera has to be positioned at a correct distance from the lenses of the optics, otherwise the image will be blurred as it is out of focus. Moreover the image sensor should not be tilted in relation to the optical axis of the lenses of the optics of the camera as such tilt will make the focus vary over the sensor surface.

Hence one contributing factor for achieving high image quality is to position the image sensor correctly. In order to correctly position the image sensor, its position must be checked in order to confirm correct positioning or suggest adjustment of the image sensor position. Today, one of two methods is commonly used in order to check the position of the image sensor.

The first method includes sending a laser beam parallel with the optical axis of the camera onto the image sensor and measuring the angle of the reflection from the image sensor. During the measurement, the lenses of the optics of the camera are removed. From this method, it is not possible to tell whether the distance to the camera optics is the correct distance or not. Moreover, if the surface of the image sensor is not flat and smooth, the accuracy of the measurement may decrease.

The second method includes capturing a target image through a lens, analyzing the captured image, and adjusting the position of the image sensor or the lens as indicated by the result from the analyses of the captured image. This method may advantageously be used for cameras in which the lens is fixedly arranged in relation to the image sensor, as the adjustments based on the analysis also takes into account defects in the lens.

SUMMARY

A method provides improved accuracy when measuring the position of an image sensor in a camera.

In particular, according to one embodiment of the invention, a method for positioning an image sensor including a light receiving plane within a camera comprises projecting a first group of substantially parallel light beams representing a first predetermined pattern onto the light receiving plane of the image sensor at an angle of incidence, projecting a second group of substantially parallel light beams representing a second predetermined pattern onto the light receiving plane of the image sensor at an angle of incidence, registering positions on the light receiving plane of the image sensor where the light beams are detected by the image sensor, generating adjustment information, based on the registered positions, indicating if the present position of the image sensor is an erroneous position or not, and adjusting the position of the image sensor based on the adjustment information.

One advantage of this method is that the precision of the positioning of the image sensor is increased. Another advantage is that the method enables detection of a plurality of different types of positioning errors and may therefore facilitate performing of correct positioning of the image sensor. Moreover, the positioning of the image sensor directly affects the image quality of captured images and therefore the method may enable increased image quality from cameras.

In another embodiment, the first group of substantially parallel light beams have a first direction of approach towards the light receiving plane of the image sensor, wherein the second group of substantially parallel light beams have a second direction of approach towards the light receiving plane of the image sensor, and wherein the first and second directions are intersecting directions. One advantage of these features is that they contribute to increase the precision of the positioning of the image sensor.

In one embodiment, the first group of substantially parallel light beams has a first direction of approach towards the light receiving plane of the image sensor, this first direction has a first component directed substantially orthogonally towards the light receiving plane of the image sensor and a second component directed orthogonally to the first component, wherein the second group of substantially parallel light beams have a second direction of approach towards the light receiving plane of the image sensor, this second direction has a first component directed substantially orthogonally towards the light receiving plane of the image sensor and a second component directed orthogonally to the first component, and wherein the direction of the second component of the first direction has a direction that is the opposite direction to the direction of the second component of the second direction. One advantage of these features is that they contribute to increase the precision of the positioning of the image sensor.

In a particular embodiment, the angle of incidence of the substantially parallel light beams of the first group and the second group, respectively, is at least 30 degrees.

In another embodiment, the angle of incidences of the substantially parallel light beams of the first group and the second group, respectively, is at least 45 degrees.

According to one embodiment, the color of the light beams of the first group of substantially parallel light beams differs from the color of the light beams of the second group of substantially parallel light beams. The use of light of different color may facilitate analysis of the registered light beams.

According to a further embodiment, the color of the light beams of the first group of substantially parallel light beams is one of the colors comprised in the group of red, green, and blue, and wherein the color of the light beams of the second group of substantially parallel light beams is another one of the colors comprised in the group of red, green, and blue.

The identification of the groups of substantially parallel light beams is even more facilitated if the colors are clearly separated.

According to another embodiment, the difference in color corresponds to at least 25 nm difference in wavelength between the colors of the two groups of substantially parallel light beams. The identification of the groups of substantially parallel light beams is even more facilitated if the colors are clearly separated in wavelength. In one embodiment, the projecting of the first group of substantially parallel light beams onto the light receiving plane of the image sensor is performed during a first time period, wherein projecting of the second group of substantially parallel light beams onto the light receiving plane of the image sensor is performed during a second time period, and wherein the first time period includes at least one time period not included in the second time period. The advantage of this embodiment is also to facilitate identification of the light beams belonging to each of the groups of substantially parallel light beams. The previous embodiment may also include the restriction that the second time period includes at least one time period not included in the first time period.

In another embodiment, the act of projecting a first and a second group of substantially parallel light beams includes the act of collimating the light.

In yet another embodiment, the first predetermined pattern and the second predetermined pattern are substantially identical. This embodiment may facilitate identification of the differences resulting from erroneous positioning of the image sensor.

In a further embodiment, at least one of the predetermined patterns includes parallel lines having a length stretching substantially from one edge of the effective surface of the image sensor to an opposite edge of the effective surface of the image sensor.

According to one embodiment, the method further includes determining a distance between the pattern projected using the first group of substantially parallel light beams and the pattern projected using the second group of substantially parallel light beams, and determining at least one erroneous state based on the distance between patterns.

According to another embodiment, the first group of substantially parallel light beams and the second group of substantially parallel light beams are generated using a single light emitting device.

In another embodiment, the act of projecting a first group of substantially parallel light beams includes sending substantially parallel light beams into the camera at an angle being substantially orthogonal to the light receiving plane of the image sensor, redirecting the substantially parallel light beams, at a redirection surface, towards the light receiving plane of the image sensor at the angle of incidence, the redirection of the light beams is not performed until the light beams have passed a lens mount of the camera. The advantage of this embodiment is that the resolution of the sensor position test may be achieved even if the light entering opening of the camera is too small to enable large enough angle of incidence for sending the light beams directly at this angle.

According to another aspect of the invention, a measuring system for measuring the position of an image sensor in a camera comprises a first light source arranged to emit a first group of substantially parallel light beams representing a first predetermined pattern, a second light source arranged to emit a second group of substantially parallel light beams representing a second predetermined pattern, and wherein the first light source and the second light source are directed to make the light beams from respective light source intersect the light beams from the other light source. One advantage of this system is that it allows for precise positioning of an image sensor in a camera. Another advantage of the system is that the system may identify different types of positioning errors of the image sensor.

According to one embodiment, the first light source comprises a light emitting device, a light collimator and a pattern generator.

According to another embodiment, the first light source comprises a light director arranged to redirect light beams from a light emitting device into a direction intersecting the light beams from the second light source.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures like reference characters designate like or corresponding parts throughout the several figures.

DETAILED DESCRIPTION

The present invention relates to a method for positioning an image sensor in a camera and to a device or system for identifying erroneous positioning of an image sensor in a camera.

Figure 1:
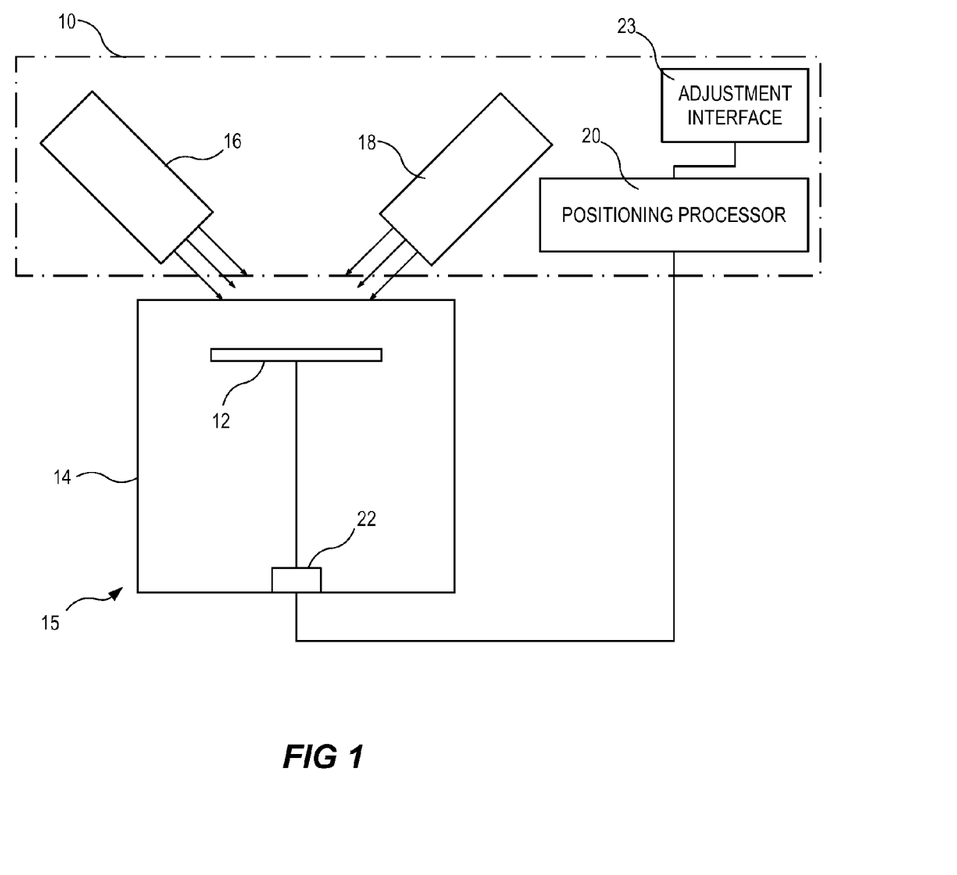
FIG. 1 is a schematic diagram depicting an arrangement for positioning an image sensor in accordance with one embodiment of the invention.

Now referring to FIG. 1, a measuring system 10 or measuring device arranged to measure the positioning of an image sensor 12 within a camera housing 14 of a camera 15 in order to enable highly accurate positioning of the image sensor 12 according to one embodiment of the invention includes two light sources, a first light source 16 and a second light source 18, directed towards each other and towards the image sensor 12 to be positioned. The light emitting from the two light sources 16, 18 may, according to one embodiment, originate from two separate light emitting devices or may, according to an alternative embodiment, originate from a single light emitting device and some kind of light beam splitter, e.g. a prism, mirrors, etc. The light sources 16, 18, are arranged to generate collimated light forming a predetermined pattern. Collimated light or collimated light beams are light beams that are substantially parallel.

Further, the image sensor is connected to a positioning processor 20 of the measuring system 10. The positioning processor 20 is a device arranged to process image data captured by the image sensor 12 within the camera housing 14. The image data may be outputted by the camera electronics via a connector 22 arranged in the camera housing 14 and then received at an input at the positioning processor 20. Then the positioning processor 20 processes the image data and presents data to an operator from which data the operator is able to determine the art of possible deviations or the positioning processor 20 processes the image data, analyse it, and determine any deviations in the resulting captured image from the camera 15 in relation to an expected image. The presentation to an operator may simply be a visual presentation of the captured image. In case of the positioning processor 20 determining deviations, such data may be sent to an adjustment device enable to adjust the image sensor based on the data received from the positioning processor 20.

Figure 2:
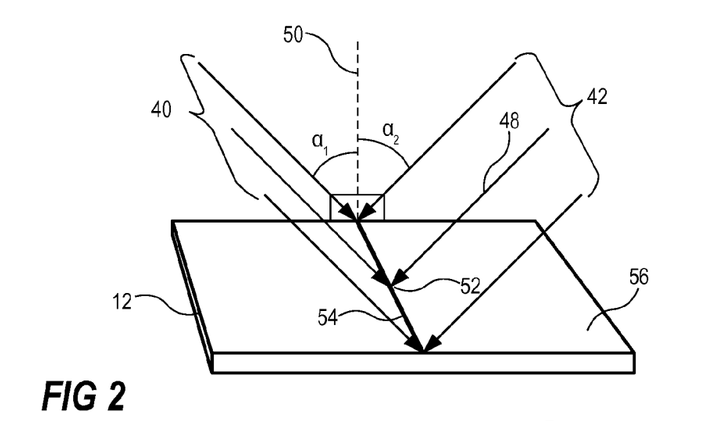
FIG. 2 is a schematic view of groups of light beams arriving at an image sensor in accordance with one embodiment of the invention.

In FIG. 2, a simplified example is shown in order to facilitate the understanding of the invention. In this example, two groups of collimated light beams 40, 42, are shown, a first group of collimated light beams 40 and a second group of collimated light beams 42. Each group of collimated light beams is forming a line. Both groups of collimated light beams are sent towards the image sensor at an angle of incidence $\alpha_1$ and $\alpha_2$, respectively. The angle of incidence $\alpha_1$ for the first group of collimated light beams 40 may differ from the angle of incidence $\alpha_2$ for the second group of collimated light beams 42. It may, however, be advantageous to make the angle of incidence $\alpha_1$, $\alpha_2$, of the two groups of collimated light beams 40, 42, the same, (i.e. $\alpha_1=\alpha_2$). In this example, $\alpha_1=\alpha_2=45$ degrees. The angle of incidence being the angle that a beam of light 48 falling on a surface makes with the normal 50 drawn at the point of incidence 52. In the case of this example, the measuring system 10 is arranged to project the two groups of collimated light beams at a predetermined distance from a reference plane as a single line 54, i.e. the projected pattern of the first group of collimated light beams 40 being a line, the projected pattern of the second group of collimated light beams 42 being a line, and these projected patterns of the first and second groups of collimated light beams are intended to coincide at the predetermined distance. Hence, if the image sensor and, thus, a light receiving plane 56 of the image sensor, is positioned at the predetermined distance as in FIG. 2, a single line is detected by the image sensor.

The reference plane described above may be a plane defined by properties of a lens mount of the camera, thereby relating the distance and angles to the optical path into the camera and to the focal plane of lenses mounted on the camera.

Figure 3:
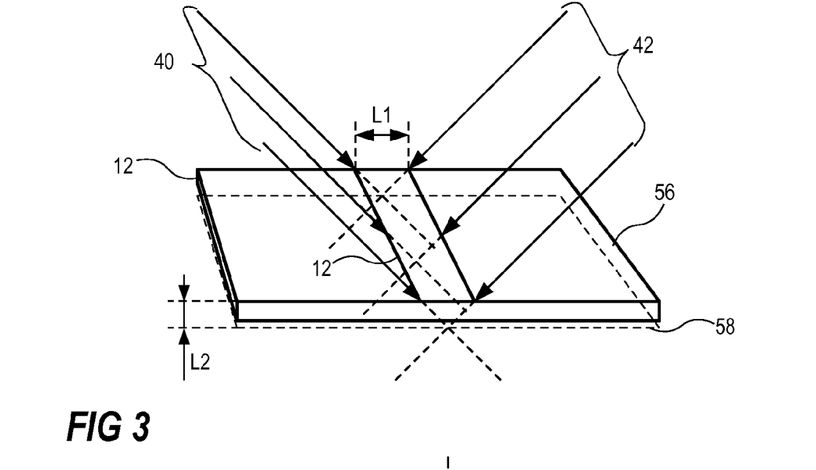
FIG. 3 is a schematic view of the image sensor in FIG. 2 being out of position the light beams arrive at it.

In FIG. 3, the same setup of the measuring system as in FIG. 2 is used. Thus, the patterns of the first and second groups of collimated light beams are lines and the incident angles of the light beams in both groups are 45 degrees. However the image sensor 12 and its light receiving plane 56 is not correctly positioned. The correct position of the light receiving plane is indicated by dashed frame 58. As seen in FIG. 3, the projected lines of each group of collimated light beams 40, 42 is now arriving at the light receiving plane as two separate lines 60, 62. The distance L1 between the two lines indicates the deviation L2 from the correct positioning. In this example, the image sensor 12 is positioned at a distance from the correct position, but still being positioned parallel with the correct position of a light receiving plane. Other errors that may be detected using the inventive system or method is tilted image sensors, sensor surfaces not being flat, etc. The example of FIG. 3 is shown as a side view in FIG. 4. This simplified way of illustrating groups of light beams projected towards the sensor will be used in other examples hereinafter.

Figure 4:
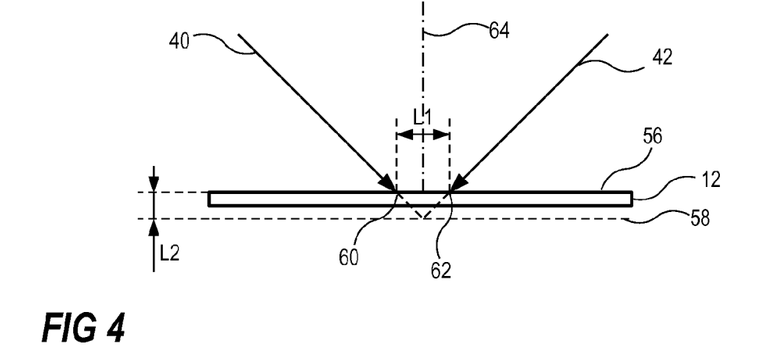
FIG. 4 is side view of the image sensor in FIG. 3, in the same position as the image sensor of FIG. 3.

In FIG. 4, the precision of this type of measuring method is illustrated using the example of FIG. 3. The deviation of the positioning of the light receiving plane 56 of the image sensor from the correct position of the light receiving plane 58 along the optical axis 64 of the camera system may be calculated by determining the detected positions 60, 62 of the two light beams 40, 42 and knowing the angle of incident of the light beams. In the example shown in FIG. 4, these two light beams converge in the correctly positioned light receiving plane 58 and, thus, are detected at a distance L1 from each other when the light receiving plane 56 is moved along the optical axis 64 of the camera system. Due to the angle of incidence being 45 degrees in this example, the deviation L2 of the position of the light receiving plane 56 from the correct position of the light receiving plane 58 in a direction parallel to the optical axis may be easily calculated due to the geometry as the deviation L2 being half the distance of the distance L1 between the two positions of the light beams arriving at the light receiving plane 56. Hence, the positional error in the direction of the optical axis may be calculated as L2=L1/2 in this specific case. If the angle of incident is set to another angle, trigonometric functions may be used to calculate the positional error L2 based on distance L1.

From this example, we also may conclude that the precision of the measurement depends on the precision of the measurement of positions on the image sensor. For instance, if the precision of measuring positions on the sensor is one pixel then the precision will be half a pixel. For an image sensor like Aptina MT9P401, in which the pixel pitch is 2.2 μm, the precision will be 1.1 μm.

Figure 5A:
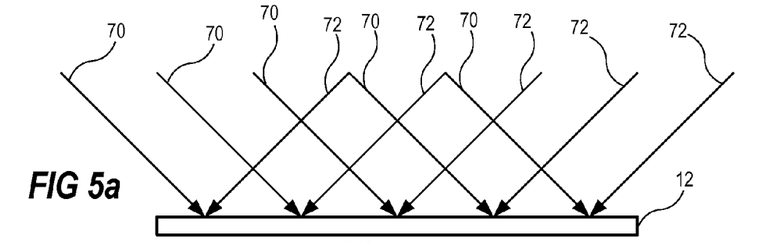
FIG. 5a is a schematic side view of the projection of lines onto an image sensor according to one embodiment when the image sensor is arranged in the optimal position.
Figure 5B:
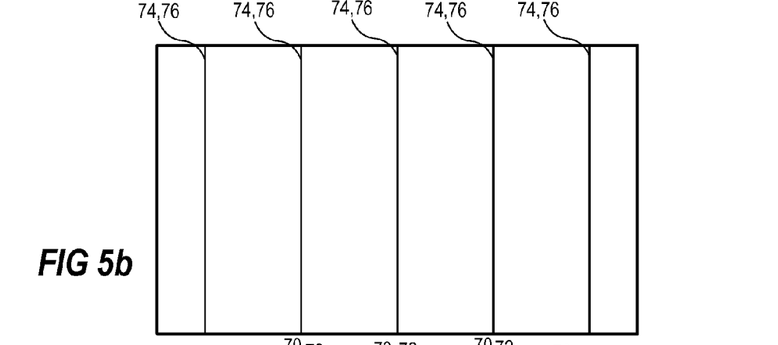
FIG. 5b is a schematic view of the light registered by the sensor in FIG. 5a, FIG. 6a is a schematic view of the image sensor showing the light beams arrival at the image sensor when the image sensor is arranged further along the optical path.

In one embodiment, the pattern projected onto the image sensor 12 by means of each group of collimated light beams 70, 72 is a plurality of lines, see FIGS. 5a and 5b. In FIG. 5a, the light beams traveling towards the image sensor 12 is shown. In this embodiment, the two groups of collimated light beams 70, 72, each projects a pattern of lines 74, 76, onto the image sensor. The resulting image on the image sensor is shown in FIG. 5b. The light beams from the two groups of collimated light beams converges into a single pattern. Each line 74 in the pattern from the first group of collimated light beams converges into a corresponding line 76 in the pattern from the second group of collimated light beams and thus results in a pattern identical to any one of the individual patterns produced by the first or second group of collimated light beams. This resulting coinciding pattern is achieved when the light receiving plane 56 is positioned correctly, it is not tilted, and it is positioned at the correct position along the optical path.

Figure 6A:
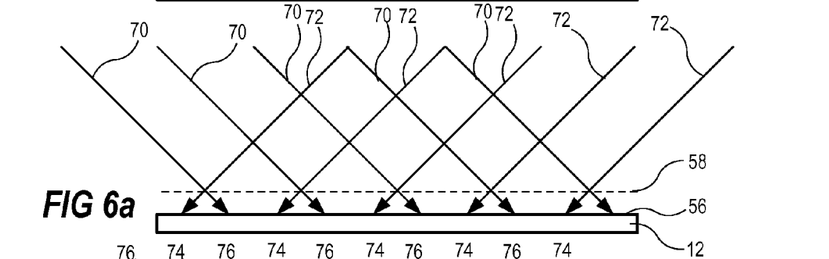
Figure 6B:
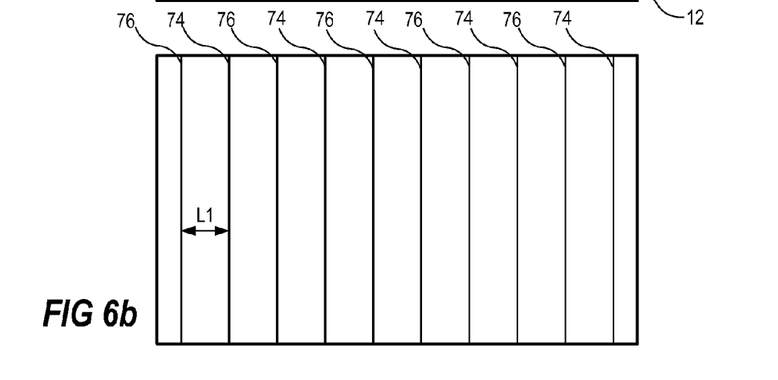
FIG. 6b is a schematic view of the light registered by the sensor in FIG. 6a, FIG. 7a is a schematic view of the image sensor showing the light beams arrival at the image sensor when the image sensor is arranged too early in the optical path.
Figure 7A:
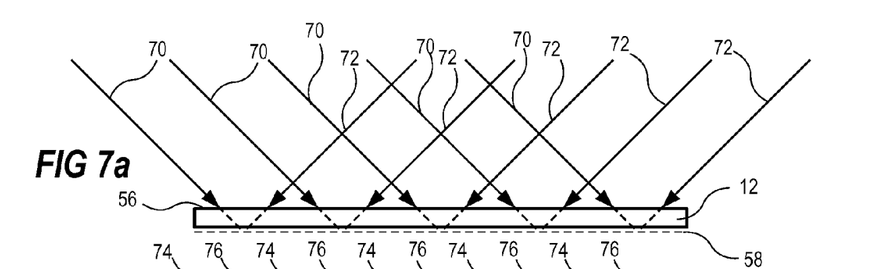
Figure 7B:
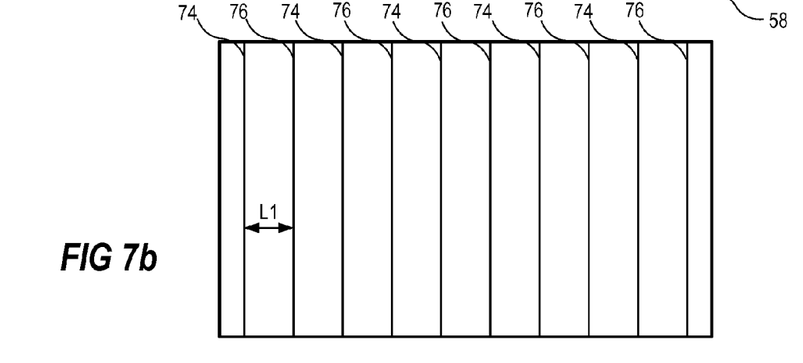
FIG. 7b is a schematic view of the light registered by the sensor in FIG. 7a, FIG. 8a is a schematic view of the image sensor showing the light beams arrival at the image sensor when the image sensor is arranged at a tilt in relation to the optical path.

Now referring to FIGS. 6a-b, when the light receiving plane 56 is not positioned at the optimal position 58, but is positioned, for example, at a position further along the optical path, further in view of the traveling direction of the light along the optical path, and still is parallel to the optimal receiving plane, then a pattern as depicted in FIG. 6b is registered by the image sensor 12. The pattern includes twice the amount of lines 74, 76, compared to the optimal positioning of the light receiving surface as a result of the light beams from the two separate groups of collimated light beams 70, 72, which are forming the lines that do not coincide due to the positioning of the image sensor. Hence the light beams from the first group of collimated light beams 70 are registered as lines 74 and the light beams from the second group of collimated light beams 72 are registered as lines 76. As described above, the distance L1 between two lines that should have been overlaid on each other indicates the error in position in a direction along the optical axis. Moreover, independent of whether the light receiving plane 56 is positioned earlier in the optical path or further along the optical path, in relation to the optimal positioned light receiving surface 58, the pattern may be identical if the deviation from the optimal position is the same, i.e. if the light receiving surface 56 is positioned a distance x earlier in the optical path or a distance x further along the optical path, identical patterns may be the result (compare FIGS. 6a-b with FIGS. 7a-b). A scheme for finding out the direction of the error is described further below.

Figure 8A:
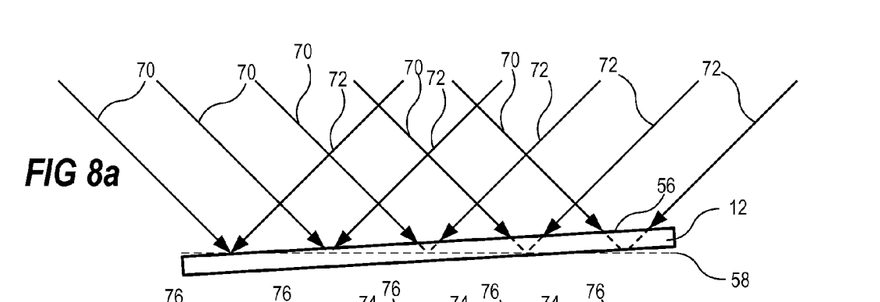
Figure 8B:
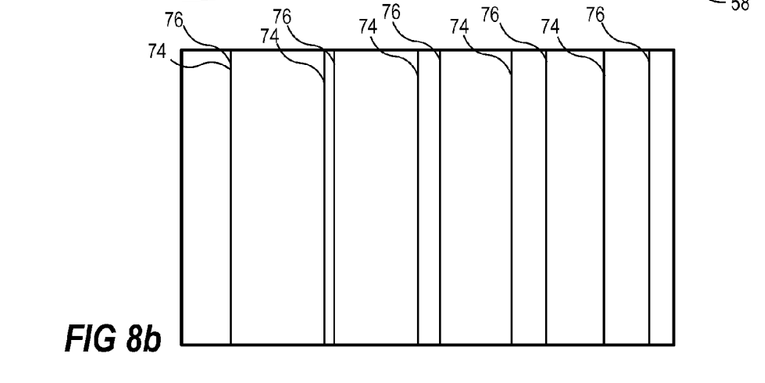
FIG. 8b is a schematic view of the light registered by the sensor in FIG. 8a, FIG. 9 is a schematic view of the light registered by the image sensor when the image sensor is tilted around the x-axis in the Figure.

In FIGS. 8a-b, the light beams from the two groups of collimated light beams 70, 72, form a pattern of lines in which the distance L1 between two lines 74, 76, which should be on top of each other, varies along the light receiving surface 56, from being on top of each other at the left most position in FIG. 8b to being at the farthest distance from each other at the right most position. This is the result of the light receiving plane 56, and thus, the image sensor 12, being tilted as shown in FIG. 8a.

Figure 9:
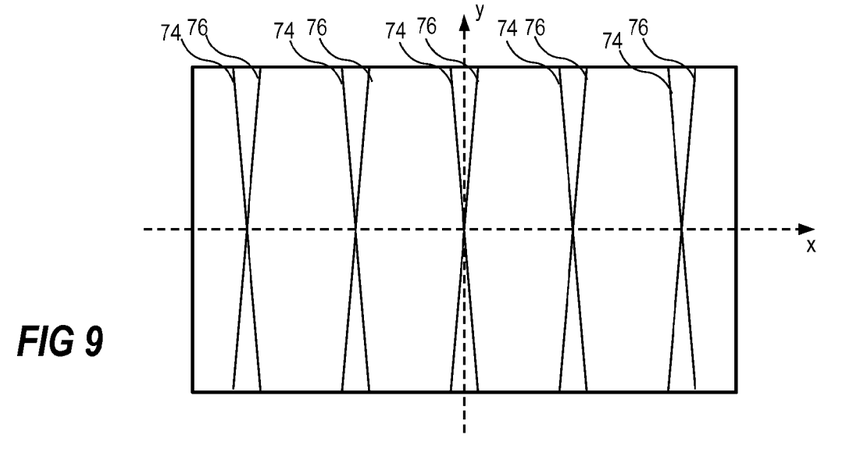

In FIG. 9, the light beams from the two groups of collimated light beams 70, 72, produce the pattern of lines crossing each other as the lines 74, 76 from each group of collimated light beams 70, 72 are slanting in different directions. If this pattern is registered by the image sensor 12 and the system is arranged to produce the pattern of FIG. 5b when the light receiving surface is at the optimal position, then the slanting lines 74, 76 indicate that the image sensor is tilted around an x-axis as shown in FIG. 9.

Figure 10:
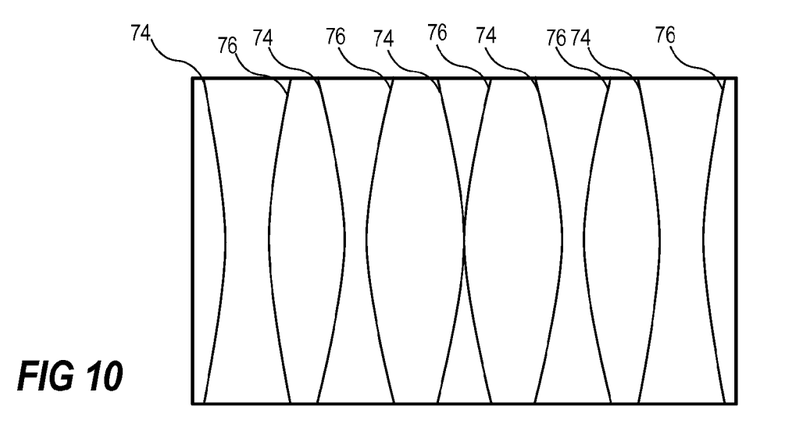
FIG. 10 is a schematic view of the light registered by the image sensor when the light receiving surface of the image sensor is bulging either outwards or inwards in relation to the body of the image sensor.

An image sensor 12 having a light receiving surface that is not flat, but is bulging either outwards or inwards in relation to the body of the image sensor, may register a pattern like the one depicted in FIG. 10, if the system is otherwise arranged to produce the pattern of FIG. 5b when the light receiving surface is at the optimal position and is flat. Other deviations from the optimal position that may be detected studying or analyzing the pattern registered by the sensor is the centering to the image sensor 12 in a plane orthogonal to the optical axis 64 and if the image sensor 12 is turned around the optical axis. These position errors may be detected as a misplaced pattern, i.e., the center of the pattern is not registered in the center of the image sensor, or as a turned pattern (e.g., the pattern does not align with the edges of the image sensor 12).

In many of the above examples, deviation of the position of the image sensor from the optimal position or sensor surface irregularities may be quickly and easily found and identified. However, a compensation direction is not obvious from the detected patterns. For instance, in the example presented above, the pattern registered by the image sensor 12 is identical if the position of the image sensor 12 is at a specific distance from the optimal position along the optical path, independently of whether this position is earlier in the optical path or further along the optical path. The difference between the patterns at these two different positions of the image sensor in the above example is that the line from the pattern projected by the first group of collimated light beams in one of the positions is registered to one side of the line from the pattern projected by the second group of collimated light beams and in the other position of the image sensor the line from the pattern projected by the first group of collimated light beams is registered to the other side of the line from the pattern projected by the second group of collimated light beams. For example, see the difference in where light beams arrive at the image sensor between FIGS. 6a-b and FIGS. 7a-b. In order to detect which one of this two positions the pattern registered by the image sensor is representing, the system may be arranged to determine the origin of a particular line in the pattern, i.e., in this embodiment, if the line is originating from the first group of collimated light beams or from the second group of collimated light beams.

One way to achieve this is to make the light beams from the first group of collimated light beams have a different wave length than the light beams from the second group of collimated light beams. For instance, the light beams from the first group may be blue and the light beams from the second group may be red. Other wavelengths of the light beams from the different groups may be used. For instance, the difference in wavelength between the first and second groups of collimated light beams may be as small as 25 nm.

Another way to achieve a detectable difference between the light beams from the different groups of collimated light beams is to send the light beams from the different groups at different points in time (e.g., light beams from the first group is sent at time t and light beams from the second group is sent at t+$t_d$). Alternatively, the light beams from the first group may be sent periodically with a periodicity of p time units (i.e., period n is sent at time p*n) and the light beams from the second group may be sent with the same periodicity but half a period apart from the first group (i.e., period n from the second group may be sent at time p*n+p/2).

Other ways to achieve a detectable difference are to have one of the groups of collimated light beams projecting wider lines than the other group of collimated light beams, to have one of the groups project light of less intensity than the other group, or to combine both of these embodiments.

Figure 11:
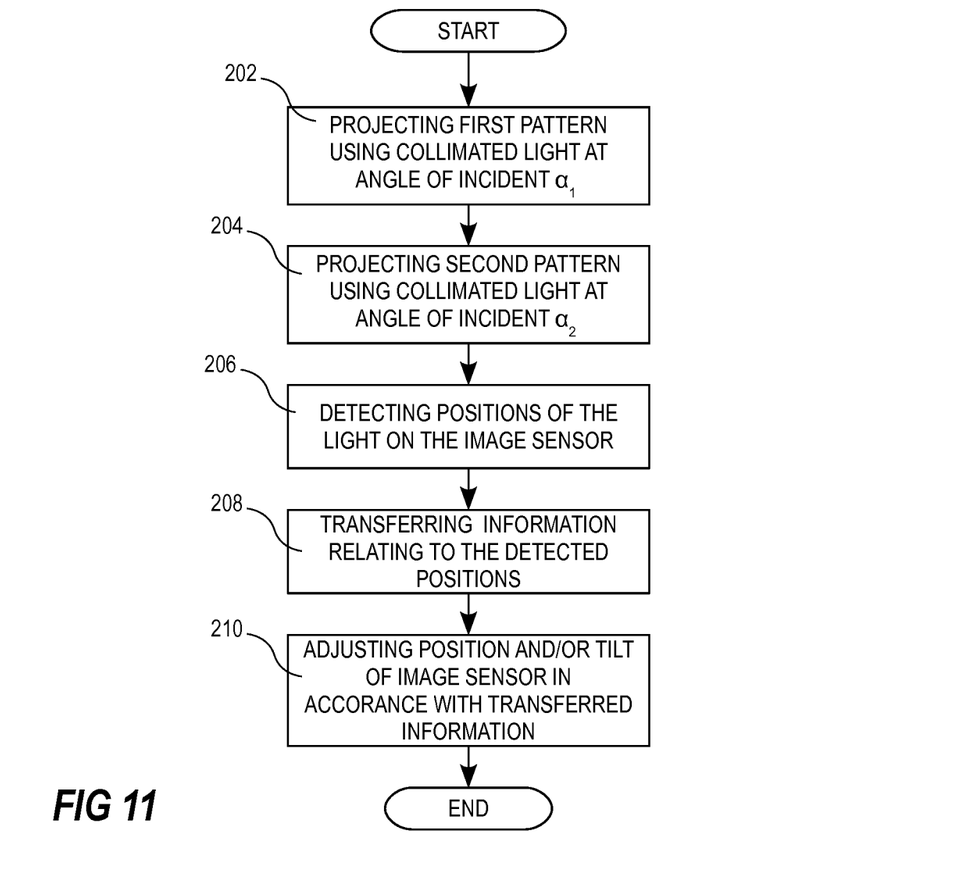
FIG. 11 is a flowchart of a process according to one embodiment of the invention.

Now referring to FIG. 11, in one embodiment the positioning of the image sensor 12 is performed by projecting a pattern from light beams of the first group of collimated light beams onto the image sensor at a predetermined angle of incidence, step 202. A pattern from light beams of the second group of collimated light beams is also projected onto the image sensor 12 at a predetermined angle of incidence, step 204. The projection of light beams from the two different groups of collimated light beams may be performed simultaneously or substantially simultaneously when using the same light color or different light color in the two groups of collimated light beams. Alternatively, when the light is sent alternately with the same periodicity in order to separate the patterns from one group of light beams from the other, then the projection of the pattern from the light beams of the first group is performed at a different point in time than the projection of the light beams from the second group. The positions of the light received at the image sensor is detected and registered, step 206. The positions of the received light are registered in the position processor 20 for further processing. Then adjustment information based on the detected positions is transferred, step 208, to an adjustment interface. This adjustment information indicates if the present position of the image sensor is an erroneous position or not. In one embodiment, the adjustment information also indicates how and by how much the image sensor should be adjusted in order not to be erroneously positioned.

The transfer to an adjustment interface may include transferring an image or a stream of images to a display. In case of transferring images or image streams, the adjustment interface is either the interface between the positioning processor and the display or it is the display itself.

Alternatively the transfer of adjustment information to an adjustment interface may include any combination of transferring deviation distance, deviation direction, deviation angle in different dimensions, etc. and the adjustment interface may be connected to an image sensor adjustment assembly arranged to adjust the positioning of an image sensor. Such adjustment assembly may be built into the camera, and if so, the adjustment interface is the interface between the camera and the positioning processor.

When the adjustment information has been transferred, the position and/or tilt of the image sensor are adjusted based on the transferred adjustment information, step 210. In case of the adjustment information being displayed on a display, an operator may control the repositioning of the image sensor and may, according to one embodiment, iteratively read the adjustment information on the display and reposition the image sensor iteratively. In case of the adjustment information being transferred to an image sensor adjustment assembly, then the image sensor adjustment assembly may perform the adjustments in accordance with the adjustment information.

Figure 12:
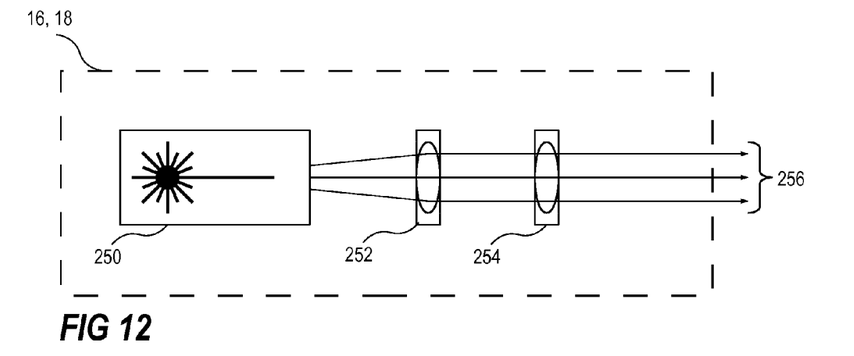
FIG. 12 is a schematic view of a light source emitting collimated light according to one embodiment of the invention.
Figure 13:
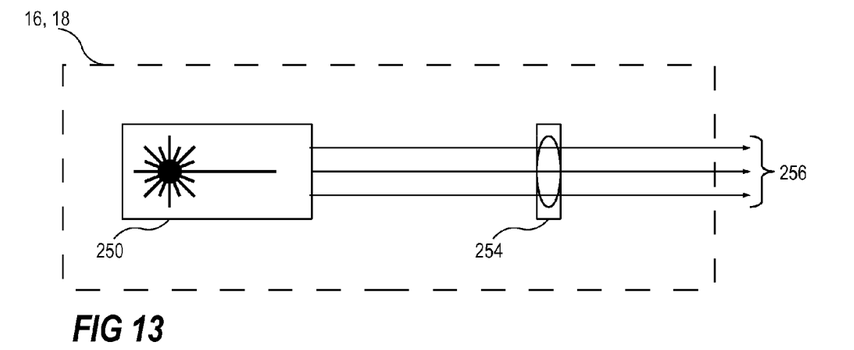
FIG. 13 is a schematic view of a light source emitting collimated light according to another embodiment of the invention.

Now referring to FIG. 12, according to one embodiment the light source 16, 18, or light sources 16, 18, may comprise a light emitting device 250 (e.g., in the form of a laser), a collimator 252, and a pattern generating lens 254. The light emitting device 250 may be any laser. In one embodiment, two lasers emitting light of different wavelengths may be used for the different light sources 16, 18, in order to provide two groups of light beams, the wavelength of the light beams being different in the two groups. The collimator 252 may be arranged in the light path of the laser 250 in order to collimate the light from the laser. If the light from the laser is collimated as it emits from the laser 250, then there is no need to use the collimator 252, see FIG. 13. The collimated light is then directed through a pattern generating lens 254 and onto the image sensor 12, in order to project the predetermined pattern onto the image sensor 12.

Figure 14A:
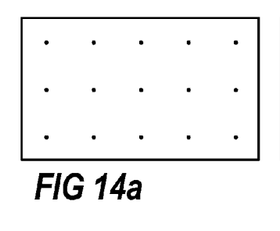
FIGS. 14a-e show examples of patterns that may be projected onto the image sensor in an implementation of the invention.
Figure 14B:
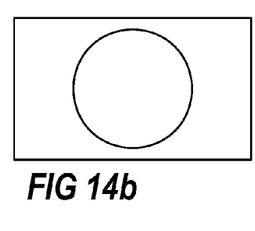
Figure 14C:
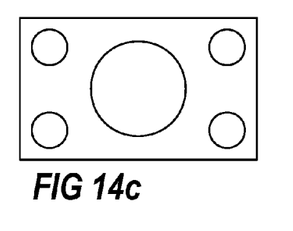
Figure 14D:
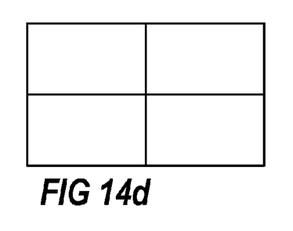
Figure 14E:
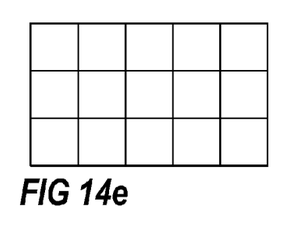

The pattern projected onto the image sensor may be of any design making it easy to measure or see distortions of the pattern or anomalies in the relation to a second pattern due to the position of the image sensor being erroneous. Alternatively to the straight line pattern discussed above, the pattern may be formed by a plurality of evenly spaced dots, (see FIG. 14a), wherein distance between dots in a single pattern or between dots of two patterns may indicate erroneous positioning of the image sensor. Another pattern that may be used is a single circle (see FIG. 14b), a plurality of circles (see FIG. 14c), a crosshair pattern (see FIG. 14d), or a cross-hatching pattern (see FIG. 14e). The above described patterns are presented by way of example and the embodiment is not limited to only these patterns. Further patterns are conceivable to consider based on this description.

In some applications, it may be difficult to make collimated light having a large angle of incidence in view of the light receiving plane 56 of the image sensor 12 to reach the image sensor 12 without being blocked by features of the camera 15. This is particularly difficult when the image sensor 12 is arranged at a great distance from the opening in the camera housing 14 that is arranged to receive light for registration by the image sensor 12. This problem may be overcome in a number of ways. One way is to include a light director 270 in the setup of the system. The light director is arranged to redirect collimated light beams 70, 72, sent parallel to the optical path. In many cases, this also means being sent orthogonal to the light receiving plane 56 of the image sensor 12 into a path having an angle of incidence α towards the light receiving plane 56 of the image sensor. The value of the angle of incidence α may be selected in accordance with previous description.

Figure 15:
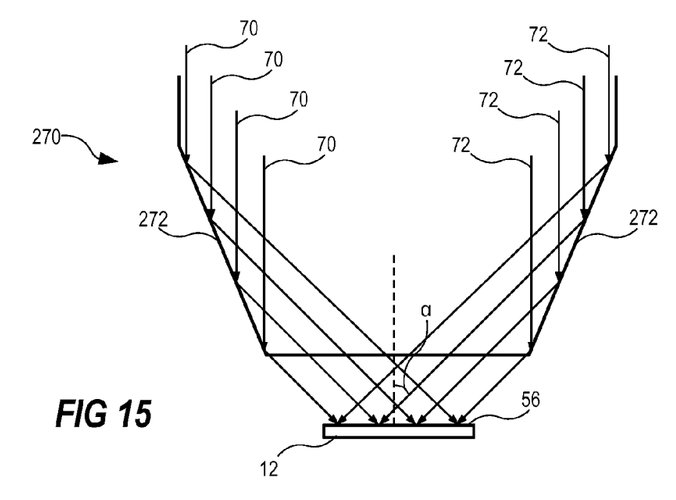
FIG. 15 shows a schematic view of a light director for angling of the light beams in the projected pattern according to one embodiment.

In FIG. 15, one embodiment of a light director 270 is shown. The redirecting of the light is performed using reflection of the light beams of the walls 272. The light director 270 may be a piece of a light guiding material, enabling reflection off its walls 272 due to the refractive indices of the material, or it may be a tube in which the walls 272 have been made reflective. The cross section of the tube may be of any shape (e.g., circular, square, triangular, oval, rectangular, star shaped, or any other polygonal shape).

Figure 16:
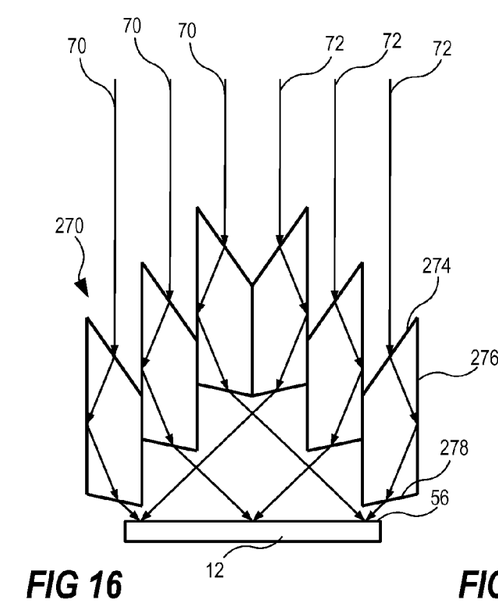
FIG. 16 shows a schematic view of a light director for angling of the light beams in the projected pattern according to another embodiment.
Figure 17:
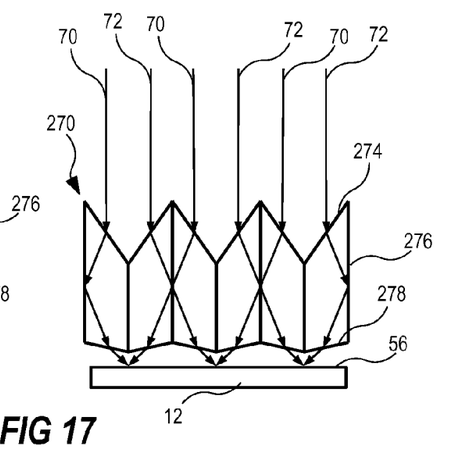
FIG. 17 shows a schematic view of a light director for angling of the light beams in the projected pattern according to yet another embodiment.

An alternative embodiment is shown in FIG. 16. In this embodiment, the light director 270 is designed to have a small width (e.g., a width similar to the width of the image sensor 12). One reason for making the light director 270 small is to enable insertion through a small camera opening in order to get the light director 270 close enough to the image light receiving plane 56 of the image sensor 12 for generating useful light beams. This embodiment may be one body or an arrangement of individual bodies of light guiding material allowing refraction and reflection of the light beams at specifically selected angles of incidence in order to redirect the incoming light direction to light beams having a desired angle of incidence. To facilitate the understanding of the light director 270, the path through the light director of one specific light beam is now described. The light beam enters the light director at a surface 274 where it is subjected to refraction and is directed towards the surface 276, where the angle of incidence is so large that the light beam is reflected towards surface 278, where the light beam once more is subjected to refraction and a light beam having the desired direction is travelling out from the light director 270. The embodiment of a light director 270 that is shown in FIG. 17 is similar to the one shown in FIG. 16. The embodiment shown in FIG. 17 may have a small width, similar to the embodiment of FIG. 16, but the height of this embodiment shown in FIG. 17 may be less. Another difference is in the organization of the optical paths. In the embodiment of FIG. 16, the optical paths 70 of one side of the exit portion of the light director 270 are all directed towards the optical paths 72 from another side of the exit portion of the light director 270. In the embodiment of FIG. 17, a light path 70 directed towards another light path 72 always exits the light director 270 next to each other, i.e. no other light path is positioned in between.

In a system implementing a light director like the ones described above, the light director may be seen as the light source. If the embodiment uses two different groups of collimated light beams and the light director therefore is outputting two different groups of collimated light beams, which are distinguished from each other in any previously described way, the light director may be seen as two separate light sources.

What is claimed is:

1. A method for positioning an image sensor including a light receiving plane within a camera, the method comprising:
projecting a first group of collimated light beams representing a first predetermined pattern onto the light receiving plane of the image sensor at an angle of incidence $\alpha_1$ for the first group;
projecting a second group of collimated light beams representing a second predetermined pattern onto the light receiving plane of the image sensor at an angle of incidence $\alpha_2$ for the second group, wherein at least one of the predetermined patterns includes parallel lines having a length stretching from one edge of the effective surface of the image sensor to an opposite edge of the effective surface of the image sensor;
registering positions of the projected light beams on the light receiving plane of the image sensor;
generating adjustment information, based on the registered positions, indicating if the present position of the image sensor is an erroneous position or not; and
adjusting the position of the image sensor based on the adjustment information.

2. Method according to claim 1, wherein the first group of collimated light beams has a first direction of approach towards the light receiving plane of the image sensor, wherein the second group of collimated light beams has a second direction of approach towards the light receiving plane of the image sensor, and wherein the first and second directions are intersecting directions.

3. Method according to claim 1, wherein the first group of collimated light beams has a first direction of approach towards the light receiving plane of the image sensor, this first direction has a first component directed orthogonally towards the light receiving plane of the image sensor and a second component directed orthogonally to the first component, wherein the second group of collimated light beams has a second direction of approach towards the light receiving plane of the image sensor, this second direction has a first component directed orthogonally towards the light receiving plane of the image sensor and a second component directed orthogonally to the first component, and wherein the second component of the first direction and the second component of the second direction are oppositely directed.

4. Method according to claim 1, wherein the angles of incidence $\alpha_1$, $\alpha_2$ of the collimated light beams of the first group and the second group, respectively, are at least 30 degrees.

5. Method according to claim 1, wherein the angles of incidence $\alpha_1$, $\alpha_2$ of the collimated light beams of the first group and the second group, respectively, are at least 45 degrees.

6. Method according to claim 1, wherein the color of the light beams of the first group of collimated light beams differs from the color of the light beams of the second group of collimated light beams.

7. Method according to claim 6, wherein a difference in color between the colors of the two groups of collimated light beams corresponds to at least 25 nm difference in wavelength.

8. Method according to claim 1, wherein projecting of the first group of collimated light beams onto the light receiving plane of the image sensor is performed during a first time period, wherein projecting of the second group of collimated light beams onto the light receiving plane of the image sensor is performed during a second time period, and wherein the first time period includes at least one time period not included in the second time period.

9. Method according to claim 1, wherein the act of projecting a first and a second group of collimated light beams includes the act of collimating the light.

10. Method according to claim 1, further comprising determining a distance between the pattern projected using the first group of collimated light beams and the pattern projected using the second group of collimated light beams, and determining at least one erroneous state based on the distance between patterns.

11. Method according to claim 1, wherein the act of projecting a first group of collimated light beams includes sending collimated light beams into the camera at an angle being orthogonal to the light receiving plane of the image sensor, redirecting the collimated light beams, at a redirection surface, towards the light receiving plane of the image sensor at the angle of incidence $\alpha_1$, wherein the redirection of the light beams is not performed until the light beams have passed a lens mount of the camera.

12. A method for positioning an image sensor including a light receiving plane within a camera, the method comprising:

generating collimated light forming a plurality of predetermined patterns;

projecting a first plurality of collimated light beams representing a first predetermined pattern onto the light receiving plane of the image sensor at an angle of incidence $\alpha_1$ for the first predetermined pattern;

projecting a second plurality of collimated light beams representing a second predetermined pattern onto the light receiving plane of the image sensor at an angle of incidence $\alpha_2$ for the second predetermined pattern;

registering positions of the projected light beams on the light receiving plane of the image sensor;

generating adjustment information, based on the registered positions, indicating if the present position of the image sensor is an erroneous position or not; and adjusting the position of the image sensor based on the adjustment information.

\* \* \* \* \*